(12) United States Patent
Meffre et al.

(10) Patent No.: US 12,078,425 B2
(45) Date of Patent: Sep. 3, 2024

(54) HEAT STORAGE DEVICE

(71) Applicant: ECO-TECH CERAM, Perpignan (FR)

(72) Inventors: Antoine Meffre, Perpignan (FR);
Guilhem Dejean, Perpignan (FR);
Davy Bruyère, Montils (FR)

(73) Assignee: ECO-TECH CERAM, Perpignan (FR)

( * ) Notice: Subject to any disclaimer, the term of this patent is extended or adjusted under 35 U.S.C. 154(b) by 261 days.

(21) Appl. No.: 17/633,303

(22) PCT Filed: Aug. 6, 2020

(86) PCT No.: PCT/EP2020/072173
§ 371 (c)(1),
(2) Date: Feb. 7, 2022

(87) PCT Pub. No.: WO2021/023834
PCT Pub. Date: Feb. 11, 2021

(65) Prior Publication Data
US 2022/0364797 A1    Nov. 17, 2022

(30) Foreign Application Priority Data
Aug. 8, 2019  (FR) .................................... 1909070

(51) Int. Cl.
*F28D 20/00*  (2006.01)
*F28D 17/00*  (2006.01)
(52) U.S. Cl.
CPC ....... *F28D 20/0056* (2013.01); *F28D 17/005* (2013.01)
(58) Field of Classification Search
CPC .............................. F28D 20/0056; Y02E 60/14
See application file for complete search history.

(56) References Cited

U.S. PATENT DOCUMENTS 4,807,696 A * 2/1989 Colvin .................. F28D 20/023
126/400
6,095,240 A * 8/2000 Hassanein ............... F28D 7/024
165/174

(Continued)

FOREIGN PATENT DOCUMENTS

CN       101952564 A     1/2011
CN       103069247 A     4/2013

(Continued)

OTHER PUBLICATIONS

International Search Report and Written Opinion dated Dec. 3, 2020 in corresponding application No. PCT/EP2020/072173; in English (total 13 pages).

(Continued)

*Primary Examiner* — Lionel Nouketcha
(74) *Attorney, Agent, or Firm* — Seckel IP, PLLC

(57) ABSTRACT

A device for storing heat energy/cold energy, including a container having a wall (102) with a first interface (110) suitable for letting a fluid into the device (100) and a second interface (111) suitable for letting the fluid out of the device (100), with a plurality of storage elements (104) being arranged in the container and configured to store heat energy/cold energy supplied by the fluid. The container has at least one perforated internal wall (105) with openings of dimensions smaller than the dimensions of the storage elements (104) and defining a first compartment (13₁) and at least one second compartment (13₂) in the container, with the plurality of storage elements (104) being distributed in the first compartment (13₁) and in said at least one second compartment (13₂).

20 Claims, 5 Drawing Sheets

(56) References Cited

U.S. PATENT DOCUMENTS

| | | | |
|---|---|---|---|
| 9,841,243 B2* | 12/2017 | Oliva Llena | ......... F28D 20/023 |
| 2013/0240171 A1 | 9/2013 | Morgan et al. | |
| 2013/0284394 A1 | 10/2013 | Morgan et al. | |
| 2015/0300751 A1 | 10/2015 | Koschnitzke et al. | |
| 2017/0363368 A1 | 12/2017 | Bergan et al. | |
| 2018/0016984 A1* | 1/2018 | Deleau | .................... F02C 6/18 |

FOREIGN PATENT DOCUMENTS

| | | | | |
|---|---|---|---|---|
| CN | 105043146 A | 11/2015 | | |
| CN | 107250706 A | 10/2017 | | |
| CN | 107621185 A | 1/2018 | | |
| EP | 2738509 A1 * | 6/2014 | ............ | F28D 20/00 |
| EP | 2738509 A1 | 6/2014 | | |
| EP | 3270087 A1 | 1/2018 | | |
| FR | 3041088 A1 | 3/2017 | | |
| WO | 2009082713 A1 | 7/2009 | | |
| WO | 2012020233 A2 | 2/2012 | | |
| WO | 2016099290 A1 | 6/2016 | | |
| WO | 2017046275 A1 | 3/2017 | | |

OTHER PUBLICATIONS

Chinese Office Action and Search Report dated Dec. 8, 2023 in counterpart application No. CN 202080056139.1; with English machine translation (total 11 pages) (note: D5, EP2738509 and D8, U.S. Pat. No. 4,807,696 cited in the Search Report of the Chinese Office Action are not listed in this IDS since they are already of record in this US application).

* cited by examiner

HEAT STORAGE DEVICE

TECHNICAL FIELD OF THE INVENTION

The technical field of the invention is that of energy saving, more particularly of the reuse of thermal energy.

The present invention relates to a thermal storage device, that is to say for storing heat energy or cold energy for subsequent release.

TECHNOLOGICAL BACKGROUND OF THE INVENTION

There are devices for storing heat for later reuse, for example after transporting the device to another site.

Conventionally, these devices comprise a container, for example a metal container, comprising a material with thermal inertia intended to store and release heat. These devices include a fluid inlet interface, making it possible to introduce a fluid into the device in order to achieve an exchange of heat between the fluid and the thermal inertia material, and a fluid outlet interface for withdrawing the fluid from the device after said exchange of heat.

The use of a thermal storage device conventionally comprises two phases.

During a first phase, or charging phase, a hot fluid is circulated in the device. An exchange of heat takes place between the hot fluid and the thermal inertia material, transferring part of the heat energy from the hot fluid to the thermal inertia material.

During a second phase, or release phase, a cold fluid is circulated in the device comprising the thermal inertia material that is charged with heat energy. An exchange of heat takes place between the thermal inertia material and the cold fluid, transferring part of the heat energy from the thermal inertia material to the cold fluid, which then heats up.

The thermal inertia material can take the form of a plurality of independent storage elements, conventionally balls of a refractory material, for example ceramic balls. This advantageously makes it possible to obtain a large contact surface between the fluid and the thermal inertia material.

However, during the charging phase, the container often expands as it is heated, causing an increase in the internal volume of the container. If the coefficient of thermal expansion of the container is greater than that of the storage elements, a free space is created when said container expands, and the storage elements can then become reorganized so as to occupy the additional space freed up by the expansion of the container. In other words, the storage elements settle in the container.

A first unfavorable consequence of the settling of the storage elements occurs during cooling of the container, during which the container tends to contract, returning to its initial volume. The new distribution of the storage elements mechanically constrains the container by opposing its contraction, thus generating mechanical stresses that are liable to damage the structure of the container.

A second unfavorable consequence of settling is an uneven distribution of the storage elements in the container. The distribution of the storage elements becomes uneven, for example a greater density in the lower part of the tank, and a lesser density in the upper part of the tank. Consequently, the space between the storage elements is larger in the upper part of the tank and smaller in the lower part of the tank.

This results in a preferential passage for the fluid in the upper part of the tank, which in turn leads to poor heat transfer between the fluid and the storage elements, in particular between the fluid and the storage elements located in the lower part of the tank.

An existing solution to avoid the settling of the storage elements consists in thermally insulating the storage elements from the wall of the container in order to limit the expansion of the wall, for example by lining the inside of the container with a thermally insulating layer. However, this solution is expensive and complex to implement.

It is therefore advisable to use simple means to avoid the settling of the storage elements.

SUMMARY OF THE INVENTION

The invention offers a solution to the problems mentioned above by proposing a new structure of a heat storage device in which the settling of the storage elements is limited using simple means.

According to one aspect, the invention provides a device for storing heat energy/cold energy, comprising
 a container comprising a wall comprising a first interface suitable for letting a fluid into the device and a second interface suitable for letting the fluid out of the device,
 a plurality of storage elements arranged in said container and configured to store heat energy/cold energy supplied by the fluid.

According to a general feature of this aspect, the container has at least one perforated internal wall comprising openings of dimensions smaller than the dimensions of the storage elements and defining a first compartment and at least one second compartment in the container, the plurality of storage elements being distributed in the first compartment and in said at least one second compartment.

The absolute variation in volume in each compartment is less than the absolute variation in volume of the entire device. The space freed up in each compartment by the expansion of the container is therefore advantageously insufficient to allow a complete reorganization of the storage elements.

In addition, the perforated wall advantageously makes it possible to maintain good circulation of the fluid while reducing the ability of the storage elements to move.

Advantageously, the system comprises a plurality of these perforated walls.

The device may include a thermally insulating layer arranged around the wall of the container.

The presence of a thermally insulating layer advantageously makes it possible to avoid heat loss to the outside of the device, and therefore to improve the efficiency thereof.

Furthermore, positioning the thermally insulating layer on the outside of the container rather than on the inside is particularly advantageous because it is less complex and less expensive to achieve.

The container may be cylindrical in shape, said at least one internal wall being perpendicular to the axis of the cylinder and/or said at least one internal wall being parallel to the axis of the cylinder.

It is thus possible to modify the dimension of the compartments in terms of length and/or height.

In this context, a cylinder is understood to be a solid generated by a line segment, called a generatrix, which moves parallel to an axis between two parallel fixed planes called the bases of the cylinder.

Thus a cylinder can have discoidal bases, ellipsoidal bases or bases of any shape. A cylinder can also have polygonal bases and in this case the cylinder is a prism. In particular, a cylinder with hexagonal bases allows optimal stacking of the storage elements. A cylinder whose bases are perpendicular to the generatrix is a right cylinder.

The width of each compartment may be less than 25 times the maximum dimension of a storage element.

This makes it possible to obtain an optimal distribution of the walls and therefore to obtain the best compromise between the efficiency of the device and its so complexity.

Each storage element has a maximum dimension of between 10 millimeters and 50 millimeters.

These dimensions of the storage elements allow the best compromise between reducing the pressure drop of the fluid between the first interface and the second interface and increasing the heat transfer between the fluid and the storage elements.

The device further comprises at least one filling opening made in the wall of the container at the highest level of the wall of the container.

This filling hole makes it possible to fill the container with the storage elements.

According to one embodiment, the device comprises at least one drainage hole made in the wall of the container at the lowest level of the wall of the container.

When a hot fluid comes into contact with the cold storage elements, condensation may form. Depending on the nature of the fluid, the condensate may be corrosive. The presence of a drainage hole at the lowest level of the wall of the container, that is to say at the bottom of the container, advantageously makes it possible to evacuate the condensates which will flow by gravity out of the device.

Each compartment may comprise one or more drainage holes.

According to one aspect, the invention proposes a condensate management system comprising a siphon including a pipe having a first end that is able to be coupled to a drainage hole and a second end submerged in a drainage pan, the siphon being configured to allow liquid to pass from the first end of the pipe to the drainage pan and to prevent liquid from passing from the drainage pan to the first end of the pipe. The condensate management system can be coupled to the storage device according to the invention.

In particular, each drainage hole can be coupled to the drainage pan by means of the siphon, the first end of which is coupled to said at least one drainage hole, the siphon being configured to allow liquid, for example a liquid formed of condensates, to pass from the container to the drainage pan and to prevent liquid from passing from the drainage pan to the container.

If the drainage holes remain exposed, it is impossible to control the pressure inside the container.

The presence of the siphon advantageously makes it possible to prevent the drainage holes from being exposed, and the liquid present in the pan from backing up into the device.

The drainage pan may comprise means for automatically filling said drainage pan suitable for pouring a filling liquid into the drainage pan as long as the quantity of filling liquid in the drainage pan is below a determined threshold.

According to one embodiment, at least one interface comprises a diffuser having a plurality of coaxial frustoconical walls and configured to circulate the fluid through spaces provided between the walls between a narrow end of the diffuser remote from the container and a wide end of the diffuser coupled to the container.

When the diffuser is placed on the first interface, allowing ingress of the fluid, the diffuser advantageously makes it possible to diffuse the fluid in the container, that is to say to distribute it throughout the internal volume of the device and therefore to improve the transfer of heat.

When the diffuser is placed on the second interface, allowing egress of the fluid, this allows better flow of the fluid to the outside of the device.

Other advantages and features of the invention will become apparent on examining the detailed description of embodiments of the invention, which are entirely non-limiting, and the accompanying drawings presented in order to facilitate understanding of the invention.

BRIEF DESCRIPTION OF THE FIGURES

The figures are presented by way of indication and do not in any way limit the invention.

DETAILED DESCRIPTION

Unless otherwise stated, the same element appearing in different figures will have a single reference sign.

Figure 1:
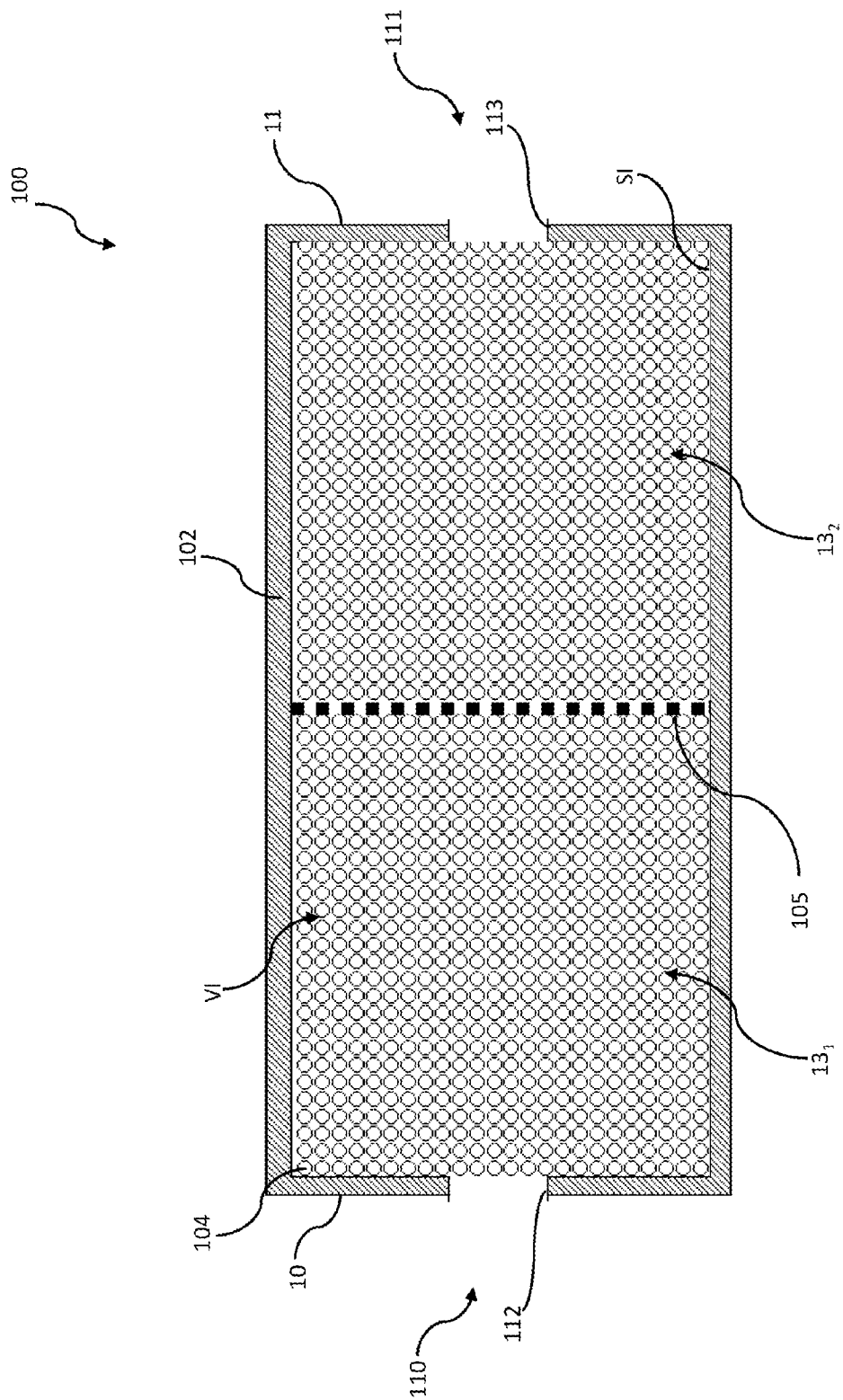
FIGS. 1 to 5 represent embodiments of a device according to the invention.

FIG. 1 is a schematic representation of a first non-limiting embodiment of a device 100 for storing heat energy and/or cold energy according to the invention.

The storage device 100 comprises a rigid container, for example a container comprising a metal wall 102, here a steel wall whose thickness is between two and eight millimeters, preferably five millimeters. In the example presented, the container has the shape of a circular right cylinder and a first flat end 10 of the container forms a first base of the cylinder and a second flat end 11 of the container forms a second base of the cylinder.

Of course, the container could just as easily have any other shape, such as a non-right cylinder, and in particular a prismatic shape, for example a parallelepiped.

The device 100 comprises an internal volume VI adapted to the circulation of a fluid, in particular a heat transfer fluid, and delimited by an internal surface SI of the device 100. In this embodiment, the internal surface SI is defined by the metal wall 102. In this case, the internal volume is a cylindrical volume.

The device 100 further comprises a plurality of storage elements 104, arranged in the internal volume VI of the container so as to occupy as much as possible of the internal volume VI. Here, the storage elements 104 are refractory ceramic balls 20 millimeters in diameter. This refractory ceramic is made from conventional raw materials such as alumina or bauxite, or from inorganic secondary raw materials, in particular steel slag, coal ash or biomass ash. Of course, the storage elements could have any other shape, any other dimension, in particular a dimension between 10 millimeters and 50 millimeters, and be made of any other known refractory material.

For the sake of simplicity, a single storage element 104 is referenced in FIG. 1.

The device further comprises a first interface 110, here an input interface, and a second interface 111, here an output interface.

The first interface 110 and the second interface 111 respectively comprise a first orifice 112 and a second orifice 113 made in the metal wall 102 of the container, respectively at the level of the first flat end 10 and at the level of the second flat end 11 so that the first orifice 112 and the second orifice 113 are opposite each other. The first orifice 112 and the second orifice 113 are suitable for fixing a duct for circulation of the fluid, in particular a gas.

Establishing the first and the second interface facing each other on opposite walls of the container is advantageous because it allows better circulation of the fluid through the device 100, but it would be quite possible for the two interfaces to not face so each other, and in particular be established on non-opposite faces of the container.

By way of example, the first interface 110 is in this case suitable for fixing a hot smoke inlet duct from an industrial furnace, and the second interface 111 is in this case suitable for fixing an outlet duct for said cooled industrial smoke.

Although a single first interface 110 and a single second interface 111 are described here, it would be entirely possible for the device to include several first interfaces and several second interfaces, and preferably a number of first interfaces equal to the number of second interfaces. In this case, the first interfaces would all be made at the level of the first flat end 10 and the second interfaces would all be made at the level of the second flat end 11.

It would also be possible for the orifices of the first and second interfaces to have different shapes and dimensions.

The device 100 here comprises a perforated internal wall 105, for example in this case a circular metal grid, the bars of which define square openings of side length 15 millimeters. According to an alternative embodiment, the perforated wall 105 is in the form of a plate comprising a plurality of bores uniformly distributed over its surface. These plates are, for example and in a non-limiting manner, of the industrial grating type, made of the same material as the container.

The wall is arranged in internal volume VI so as to be parallel to the flat ends 10 and 11, that is to say perpendicular to the axis of the cylinder formed by the container, at an equal distance from the first flat end 10 and from the second flat end 11.

The wall 105 is here dimensioned so that its diameter is slightly less than the internal diameter of the container. Typically, the diameter of the wall 105 is 5 mm less than the internal diameter of the container in order to avoid mechanical stresses between the wall 105 and the container. In addition, the wall 105 is held by at least one stop (not shown) welded to the internal face of the wall of the container.

Thus, the grid divides the internal volume VI of the device into a first compartment $13_1$ and a second compartment $13_2$. A first portion of the plurality of storage elements is located in the first compartment, and a second portion of the plurality of storage elements is located in the second compartment. Since the dimensions of the storage elements 104 are greater than the dimensions of the openings of the perforated wall 105, the storage elements located in the first compartment $13_1$ cannot fit into the second compartment $13_2$, and the storage elements located in the second compartment $13_2$ cannot fit into the first compartment $13_1$.

Thus, since each of the compartments here has a volume equal to half of the internal volume VI of the container 100, a change in a given volume of the container will correspond to a change in volume half as large in each of the compartments.

In the event of expansion of the container, the storage elements in each compartment therefore have half the space to reorganize themselves, which advantageously limits settling.

Figure 2:
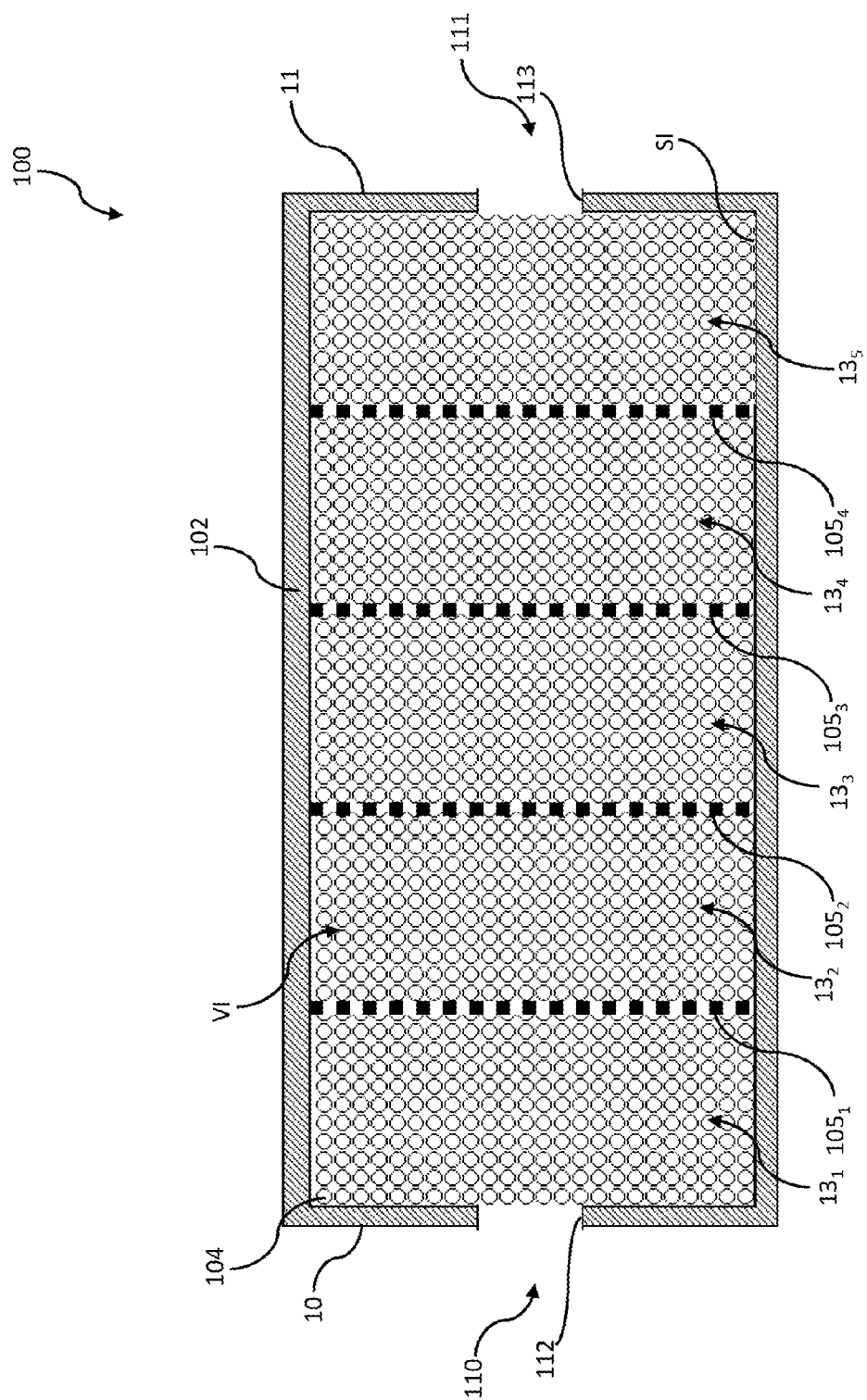

FIG. 2 The invention is not limited to a device comprising a single perforated internal wall. Thus, as illustrated in FIG. 2, the device can comprise a plurality of perforated internal walls defining a plurality of compartments.

Here, the device 100 has four perforated internal walls $105_1$, $105_2$, $105_3$, and $105_4$ dividing the internal volume VI into five compartments $13_1$, $13_2$, $13_3$, $13_4$, $13_5$, of identical dimensions and geometry.

The five perforated walls are identical to the perforated wall described previously in connection with FIG. 1, and are distributed in the container so as to define five compartments of identical dimensions, the plurality of storage elements being distributed equally in the five compartments.

Thus, since each of the compartments has a volume equal to one-fifth of the total volume of the container, an absolute change in a given volume of the container will correspond to a change in volume one-fifth as large in each of the compartments.

Thus, in the event of expansion of the container, the storage elements have even less space to reorganize, which further limits settling.

In particular, a stainless steel container 316 with a length of four meters at 25° C., and whose thermal expansion coefficient is $18*10^{-6}/°$ C., lengthens by 37 mm when its temperature reaches 500° C. The change in internal length of a compartment is therefore 9.25 mm. However, for this same temperature difference, the thermal expansion of the storage elements in a compartment, whose thermal expansion coefficient is $2.4*10^{-6}/°$ C., is 1.2 mm. There is therefore a longitudinal distance of 8.05 mm freed up in each compartment.

However, to avoid the storage elements rearranging, these must have a diameter greater than this freed-up distance, and ideally a diameter at least 1.5 times greater than the longitudinal distance freed up in each compartment, i.e. at least 12.75 mm in this last case.

There is also radial expansion, which frees up radial distance in each compartment. Likewise, to avoid the storage elements rearranging, these must have a diameter greater than this freed-up radial distance, and ideally a diameter at least 1.5 times greater than the radial distance freed up in each compartment.

Figure 3:
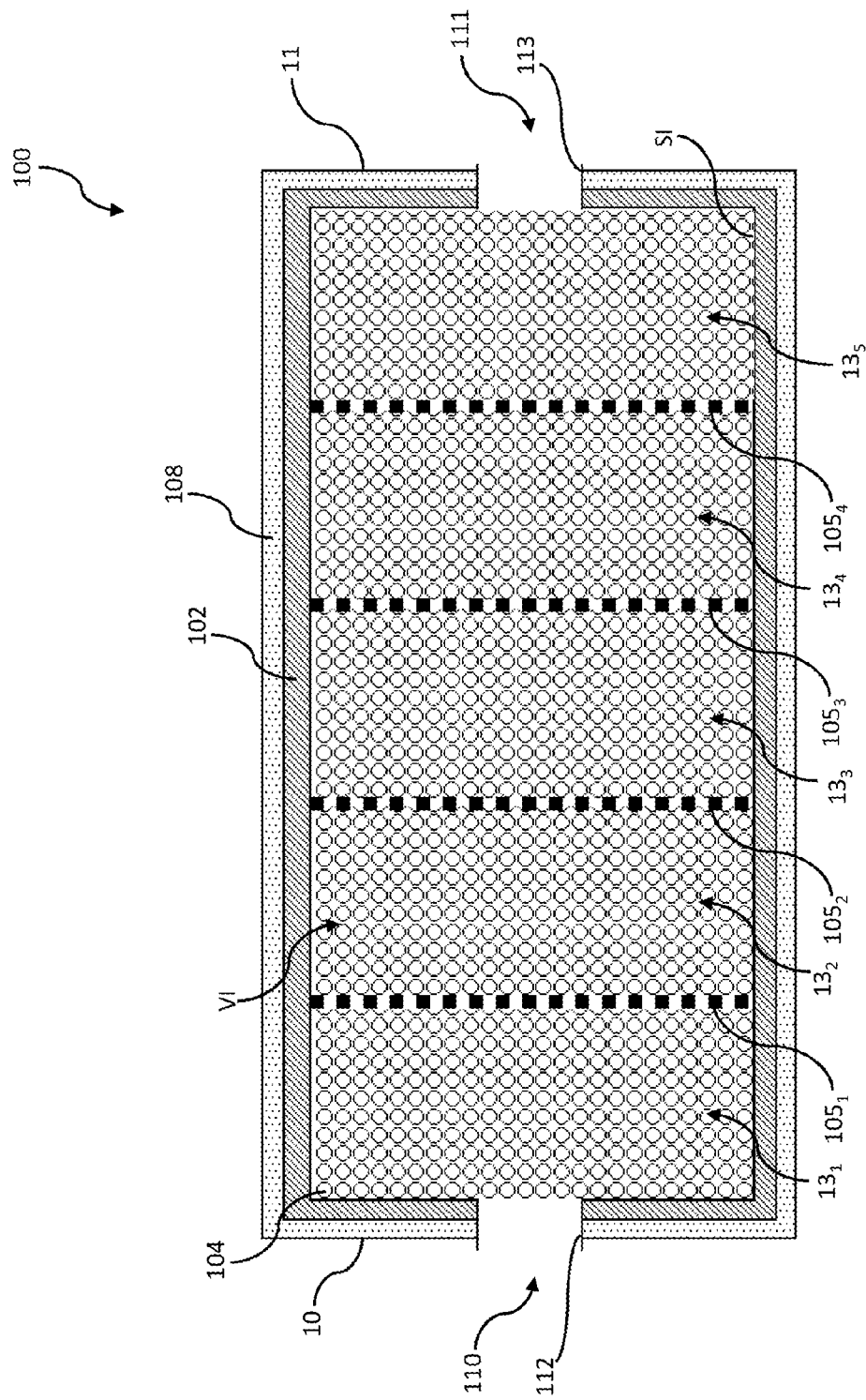

FIG. 3 According to another embodiment of the tank illustrated in FIG. 3, the device 100 comprises a thermally insulating layer 108 arranged outside the container around the metal wall 102 so as to cover its external surface. The thermally insulating layer 108 here comprises an assembly of rock wool panels. It has a thickness of 300 millimeters.

It would however be possible for the thermally insulating layer 108 to include any other insulating material, for example a material chosen from glass wool, ceramic wool, calcium silicate panels or vermiculite panels, and have any other thickness, for example a thickness between 100 millimeters and 300 millimeters.

The thermally insulating layer 108 advantageously makes it possible to avoid heat loss to the outside of the device, and therefore to improve the efficiency of heat energy storage thereof.

Thanks to the presence of the perforated internal walls, the expansion of the metal wall 102 due to the direct contact of the metal wall 102 with the storage elements 104 and with the heat transfer fluid limits the settling of the storage elements 104 in each compartment. Thus, as the tank cools, the latter regains its initial volume without the storage elements 104 exerting stresses against the metal wall 102. This embodiment therefore makes it possible to obtain, in a simple manner, a significant saving in space in the device while limiting the phenomenon of settling. Thus, no internal insulation is necessary.

Figure 4:
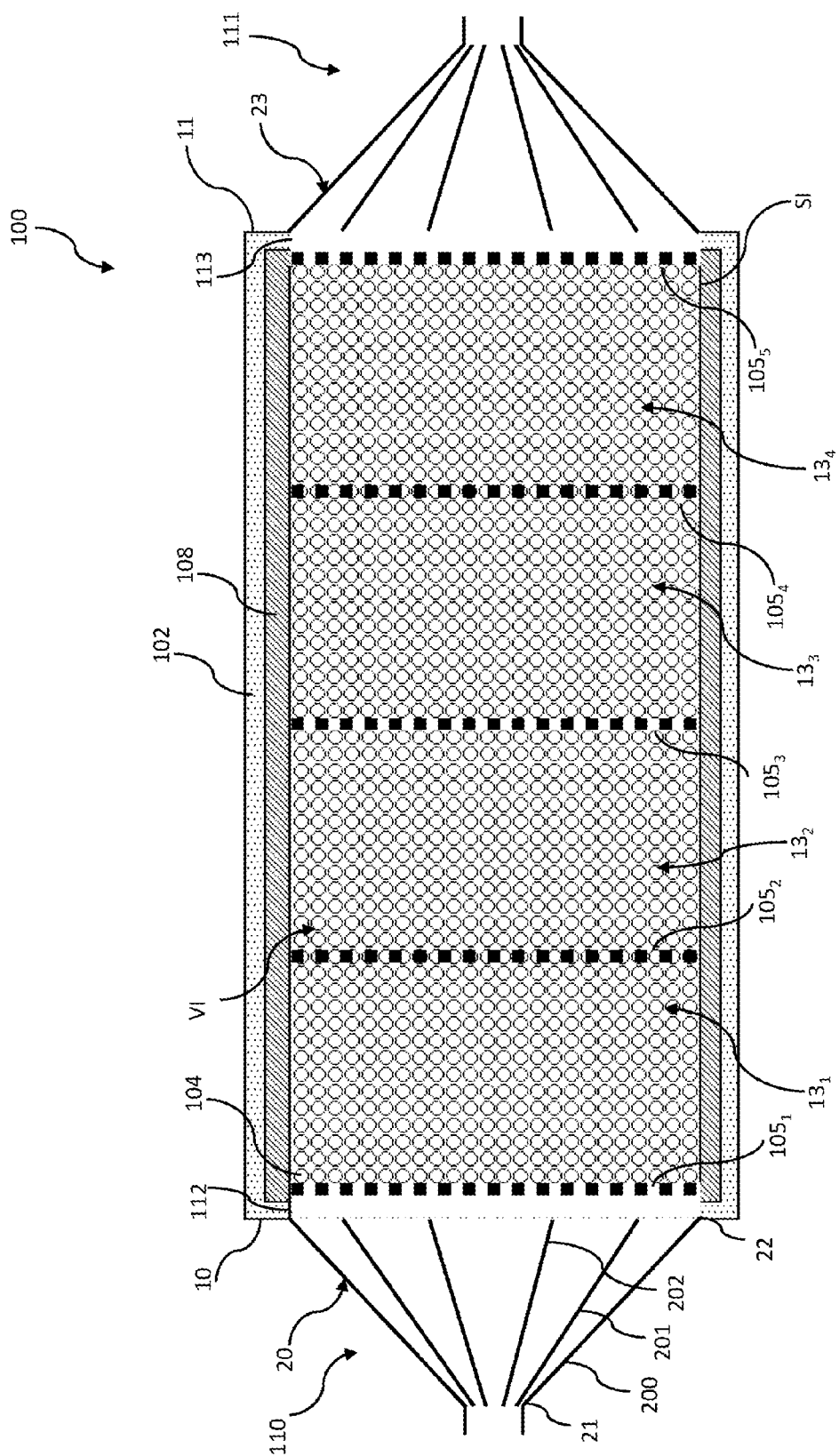

FIG. 4 illustrates a preferred embodiment in which the first interface 110 comprises a first diffuser 20 coupled to the first orifice 112 made in the metal wall 102 and in the thermally insulating layer 108 and the second interface 11 comprises a second diffuser 21 coupled to the second orifice 113 made in the metal wall 102 and in the thermally insulating layer 108. In this case, the first diffuser 20 and the second diffuser 23 are identical, so for the sake of brevity only the first diffuser 20 will be described here.

The first diffuser has three frustoconical walls 200, 201, 202 arranged coaxially around a portion of the axis of the cylinder formed by the container extending between a narrow end 21 of the first diffuser 20 and a wide end 22 of the first diffuser 20, the narrow end 21 having a diameter smaller than the diameter of the wide end 22, here a diameter seven times smaller.

The wide end 22 is coupled to the first orifice 112 which here has a diameter equal to the internal diameter of the device, that is to say to the diameter of the internal volume VI of the tank.

The narrow end 21 of the diffuser 20 is remote from the container and suitable for fixing a duct for circulating a fluid.

Thus, a fluid circulating in the first diffuser 20, for example here from the narrow end 21 to the wide end 22 and the internal volume VI of the device 100, will circulate in the spaces provided between the walls 200, 201, 202 until the internal volume VI of the device. The fluid will therefore advantageously be diffused so as to occupy the entire internal volume VI as it circulates.

The fluid circulating in the second diffuser 23 will converge from the larger-diameter wide end of the second diffuser 23 to the smaller-diameter narrow end of the second diffuser 23.

Thus, the second diffuser 23 advantageously serves to make it easier for the heat transfer fluid to leave the device.

According to this embodiment, the device 100 has five walls $105_1$, $105_2$, $105_3$, $105_4$, $105_5$. Two walls $105_1$ and $105_5$ are located respectively at the first orifice 112 and at the second orifice 113 in order to hold the storage elements in the internal volume VI of the device 100. Three walls $105_2$, $105_3$, $105_4$ divide the internal volume VI into four compartments, that is to say a first compartment $13_1$, a second compartment $13_2$, a third compartment $13_3$ and a fourth compartment 134.

Figure 5:
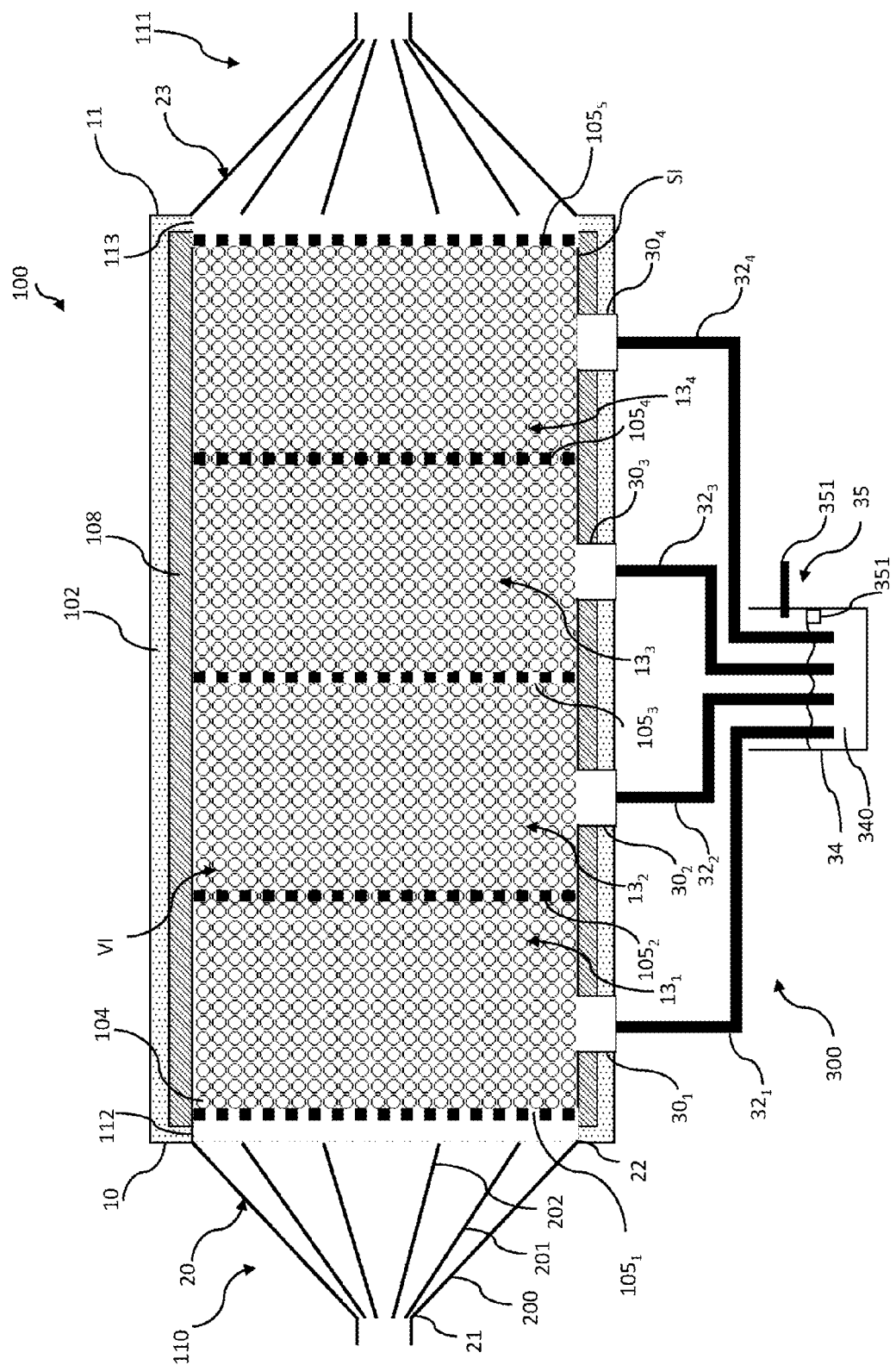

FIG. 5 According to one embodiment, illustrated in FIG. 5, the device 100 comprises a condensate management system 300. In this case, the condensate management system 300 is coupled to a storage device 100 according to the embodiment described in FIG. 4, but could be coupled to any storage device, in particular a storage device 100 according to any one of the embodiments of the invention.

According to the embodiment illustrated by FIG. 5, each compartment has a drainage orifice. In this case, the first compartment $13_1$ has a first drainage orifice $30_1$, the second compartment $13_2$ has a second drainage orifice $30_2$, the third compartment $13_3$ has a third drainage orifice $30_3$ and the fourth compartment $13_4$ has a fourth drainage orifice $30_4$. The drainage orifices $30_1$, $30_2$, $30_3$, $30_4$ are made in the metal wall 102 and in the thermally insulating layer 108, at the lowest level of the device 100.

Thus, when the device 100 is operating in charging mode, that is to say when a hot heat transfer fluid, for example hot smoke from a industrial furnace, is passing between the first interface 110 and the second interface 111, the condensates resulting from the cooling of the fluid upon contact with the colder storage elements flow by gravity toward the bottom of the internal volume VI and are evacuated by the condensate management system 300.

When the device 100 is operating in charging mode, a slight overpressure, for example of the order of 20 millibars, is applied inside the container, so as to promote the circulation of the heat transfer fluid. In addition, the device also has a discharge mode of operation, during which a cold heat transfer fluid passes through to recover the heat stored in the storage elements. In this discharge mode of operation, a slight negative pressure, for example of the order of 20 millibars, is applied inside the container, so as to promote the circulation of the cold fluid.

In these two operating modes of the device, there is therefore a pressure difference between the inside and the outside of the container. To maintain this pressure difference despite the drainage orifices $30_1$, $30_2$, $30_3$, $30_4$, the first, second, third and fourth drainage orifices $30_1$, $30_2$, $30_3$ and $30_4$ are here coupled respectively to a first, second, third and fourth pipe $32_1$, $32_2$, $32_3$ and $32_4$, each pipe being coupled to its respective orifice by a first end and has a second end immersed in a drainage pan 34 filled with a filling liquid 340, in this case water. The drainage pan 34 is located at a level below that of the orifices $30_1$, $30_2$, $30_3$ and $30_4$. Each pipe is here doubly bent and, with the drainage pan 34, forms a siphon. There is therefore a column of water in each pipe submerged in the pan 34, the height of which is sufficient to compensate for the overpressure in the container when the latter is being charged, or the negative pressure in the container when the latter is being discharged.

In addition, the siphon is also configured to allow the flow of a liquid formed of condensates from the internal volume VI of the device 100 toward the drainage pan 34, and to prevent the rise of liquid from the drainage pan 34 toward the internal volume VI of the device.

In order to ensure that the pipes $32_1$, $32_2$, $32_3$ and $32_4$ remain submerged, the condensate management system 300 comprises an automatic means of filling the tank 35, comprising a level detector 350 and a filling liquid inlet 351, here a water inlet, the level detector 350 being configured to order the liquid inlet 351 open when the filling liquid level 340 in the pan 34 is below a threshold, and to order the liquid inlet 351 closed when the filling liquid level 340 in the pan 34 is at or above the threshold.

Advantageously, the overpressure or negative pressure applied to the container depending on its operating state being 20 millibars in absolute value, the threshold is equivalent to this pressure difference at the height of the water column (that is to say 200 mm), to which a safety margin of 50 mm of water column height is added. This prevents liquid backing up from the drainage pan 34 to the internal volume VI of the device 100 in the event of the container being at negative pressure, and it also avoids having to purge the pipes $32_1$, $32_2$, $32_3$ and $32_4$ in the event of an overpressure in the volume VI of the device 100, which would have the effect of creating a hot air leak through the drainage orifices $30_1$, $30_2$, $30_3$ and $30_4$.

Although the condensate management system has been described here as being coupled to a device 100 according to the embodiment described in connection with FIG. 1, the condensate management system 300 is compatible with all the embodiments of the invention, in particular the embodiments described in connection with FIGS. 1 to 5. In addition, the condensate management system can be applied to any tank or vessel where condensate drainage and recovery is required. According to the embodiments, a device 100 comprising the condensate management system 300 may include a single drainage orifice in each compartment, several drainage orifices in each compartment or even one or more orifices in only some of the compartments.

Whatever the embodiment of the invention, the cylindrical container 100, when it has a length greater than its diameter, is placed horizontally on the ground, that is to say that the directrix of the cylinder is oriented parallel to the plane containing the ground on which the container 100 rests. This arrangement of the container 100 offers the double advantage on one hand of making it easier to transport the container 100, and on the other hand of limiting the height of the distribution of the storage elements 104. In fact, the force due to gravity exerted by the storage elements 104 on the lower wall of the container 100 is limited.

The embodiments described above are entirely non-limiting, and modifications can be made to them without departing from the scope of the invention. For example, in the context of containers of particularly large diameter, it is advantageous to partition the internal volume by means of at least one solid wall extending in the direction of the length of the cylinder, parallel to its longitudinal axis, to form an upper volume and a lower volume. Such a container comprises perforated plates which extend perpendicularly to the longitudinal axis of the container, and which are distributed in the upper volume and in the lower volume of the container. Like the perforated plates, this horizontal wall rests on supports that are integral with the wall of the container. Such a configuration of the container makes it possible to limit the temperature stratification in the container when the storage elements are charged with heat energy.

The invention claimed is:

1. A device for storing heat energy/cold energy, comprising:
    a container comprising a first end wall comprising a first interface suitable for letting a fluid into the device, a second end wall comprising a second interface suitable for letting the fluid out of the device, and a side wall connecting the first end wall and the second end wall along a main longitudinal direction of the container,
    a plurality of storage elements arranged in the container and configured to store heat energy/cold energy supplied by the fluid,
    wherein the container has at least one perforated internal wall comprising openings of dimensions smaller than the dimensions of the storage elements and defining a first compartment and a second compartment in the container, the plurality of storage elements being distributed in the first compartment and in the second compartment,
    wherein each of the first compartment and the second compartment has a respective drainage orifice in the side wall.

2. The device as claimed in claim 1, wherein the device comprises a plurality of perforated internal walls.

3. The device as claimed in claim 2, comprising a thermally insulating layer arranged around the walls of the container.

4. The device as claimed in claim 3, wherein the side wall of the container has a shape of a cylinder, the at least one perforated internal wall being perpendicular to an axis of the cylinder.

5. The device as claimed in claim 2, wherein the side wall of the container has a shape of a cylinder, the at least one perforated internal wall being perpendicular to an axis of the cylinder.

6. The device as claimed in claim 2, wherein the side wall of the container has a shape of a cylinder, at least one additional perforated internal wall being parallel to an axis of the cylinder.

7. The device as claimed in claim 1, comprising a thermally insulating layer arranged around the walls of the container.

8. The device as claimed in claim 7, wherein the side wall of the container has a shape of a cylinder, the at least one perforated internal wall being perpendicular to an axis of the cylinder.

9. The device as claimed in claim 7, wherein the side wall of the container has a shape of a cylinder, at least one additional perforated internal wall being parallel to an axis of the cylinder.

10. The device as claimed in claim 1, wherein the side wall of the container has a shape of a cylinder, the at least one perforated internal wall being perpendicular to an axis of the cylinder.

11. The device as claimed in claim 10, wherein the side wall of the container has a shape of a cylinder, at least one additional perforated internal wall being parallel to an axis of the cylinder.

12. The device as claimed in claim 1, wherein the container has a shape of a cylinder, at least one additional perforated internal wall being parallel to an axis of the cylinder.

13. The device as claimed in claim 1, wherein a transverse dimension of each compartment is less than 25 times a maximum dimension of a storage element among the plurality of storage elements.

14. The device as claimed in claim 13, wherein each of the storage elements has a maximum dimension in a range of from 10 millimeters to 50 millimeters.

15. The device as claimed in claim 1, wherein the device comprises at least one filling opening made in the wall of the container at a highest level of the wall of the container.

16. The device as claimed in claim 1, wherein each of the drainage orifices is made in the side wall of the container at a lowest level of the side wall of the container.

17. The device as claimed in claim 16, wherein each of the compartments has a drainage orifice.

18. The device as claimed in claim 17, wherein each of the drainage orifices is coupled to a drainage pan by a siphon comprising a pipe having a first end coupled to the drainage pan and a second end submerged in the drainage pan, the siphon being configured to allow liquid to pass from the container to the drainage pan and to prevent liquid from passing from the drainage pan to the container.

19. The device as claimed in claim 18, wherein the drainage pan comprises means for automatically filling the drainage pan suitable for pouring a filling liquid into the drainage pan as long as a quantity of filling liquid in the drainage pan is below a determined threshold.

20. The device as claimed in claim 1, wherein at least one of the interfaces comprises a diffuser having a plurality of coaxial frustoconical walls and configured to circulate the fluid through spaces provided between the coaxial walls between a narrow end of the diffuser remote from the container and a wide end of the diffuser coupled to the container.

* * * * *